United States Patent

[11] 3,613,753

| [72] | Inventor | Wayne Wolf |
| --- | --- | --- |
| | | Cedar Rapids, Iowa |
| [21] | Appl. No. | 817,805 |
| [22] | Filed | Apr. 21, 1969 |
| [45] | Patented | Oct. 19, 1971 |
| [73] | Assignee | Vaughan & Bushnell Mfg. Co. |
| | | Hebron, Ill. |

[54] HOLLOW HAMMER HANDLE WITH LONGITUDINALLY TENSIONED GLASS FIBERS
5 Claims, 4 Drawing Figs.

[52] U.S. Cl. .................................................... 145/61 R, 145/29 R
[51] Int. Cl. ..................................................... B25g 1/10
[50] Field of Search ......................................... 145/61, 24, 64; 264/229

[56] References Cited
UNITED STATES PATENTS

| 2,940,492 | 6/1960 | Curry et al. ............... | 145/61 |
| 3,057,767 | 10/1962 | Kaplan ....................... | 264/157 X |
| 3,129,737 | 4/1964 | Citroen ...................... | 145/29 |

Primary Examiner—Robert C. Riordon
Assistant Examiner—Michael Koczo, Jr.
Attorney—Norman H. Gerlach ABSTRACT: A hollow hammer handle formed of polymerized plastic material with continuous longitudinally tensioned glass fibers extending throughout its length.

PATENTED OCT 19 1971
3,613,753
FIG. 1  FIG. 4  FIG. 2
FIG. 3
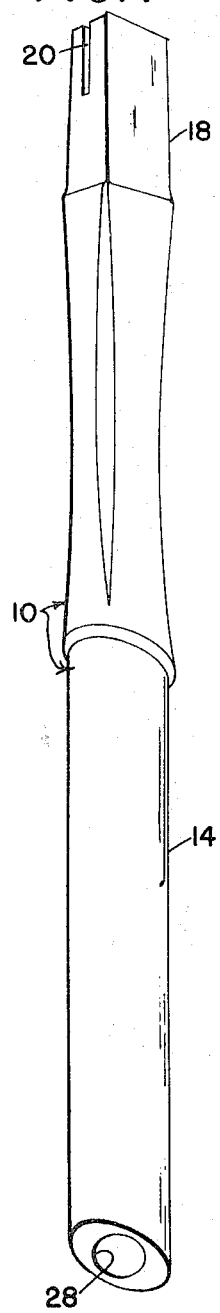
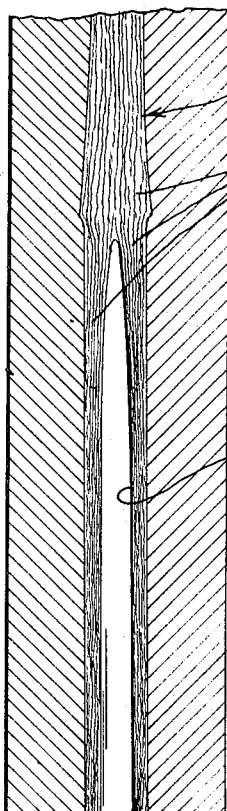
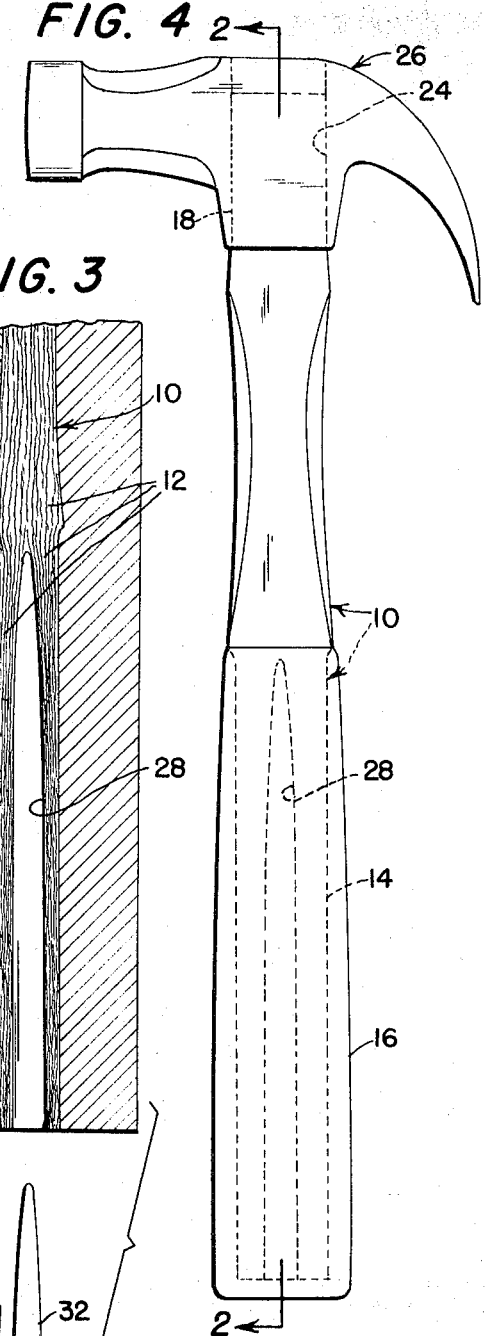
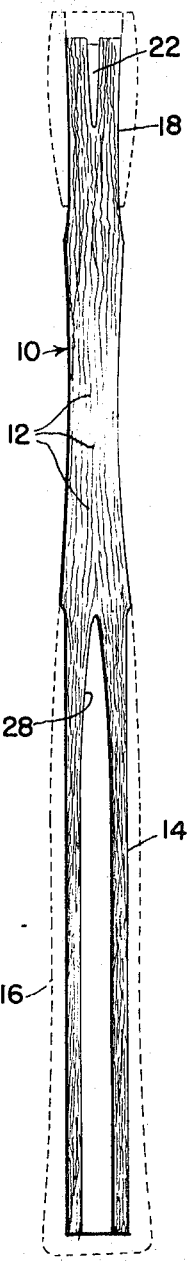
INVENTOR.
WAYNE WOLF
BY Norman F. Gerlach
Atty.

HOLLOW HAMMER HANDLE WITH LONGITUDINALLY TENSIONED GLASS FIBERS

The present invention relates to a handle for a striking tool such as a hammer and has particular reference to a hollow fiber glass reinforced handle for such a tool.

Fiber glass reinforced hammer handles having longitudinally extending reinforcing glass fibers therein are well known in the art. Such handles, however, are solid throughout and the longitudinally extending glass fibers which are contained therein are not under tension and thus they are not necessarily linearly straight from one end thereof to the other. These handles, being solid, are of undue weight if correct hammer head weight and handle length and thickness are preserved. Considering a hammer head which weighs approximately 16 ounces (a long accepted standard for the head of an ordinary carpenter's claw hammer), a solid resin-impregnated fiber glass handle therefor having acceptable proportions comparable to those of a hickory handle will have an excess weight of several ounces, thus rendering the hammer as a whole unacceptable by a professional carpenter due to its lack of proper balance and its excess weight. According to the present invention, by providing a hollow bore of predetermined length and volume, it is possible to construct a fiber glass hammer handle which meets the most exacting preferences of a carpenter as regards its size, shape and weight.

A hollow tubular fiber glass rod has heretofore been constructed and used as a handle for an impact tool, and more specifically as a golf club shaft. Such a rod, however, consists essentially of fiber glass cloth which is coiled about a mandrel with resin polymerization taking place while the cloth is on the mandrel. The fiber glass content of such a hollow rod is relatively small since only the spaced warp threads extend axially of the rod. Furthermore, these warp threads are not under tension so that they are not necessarily linearly straight. When wrapped from fiber glass tape in helical fashion, such threads are not continuous throughout the length of the rod. Finally, since such a rod is hollow throughout its entire length, i.e., is tubular from end to end, it is not suitable for use as hammer handle since the latter requires a solid section at least in the vicinity of the hammer head. Such a solid section is necessary not only to provide a reaction surface to absorb a misdirected blow of the hammer when the nail or other object being struck impinges against the handle in the vicinity of the head, but also to lend proper balance to the hammer as a whole. A hammer which is not properly balanced feels awkward in the hand of the experienced user and, in swinging the same, centrifugal and other forces are set up which give an unnatural feeling to the user just as an improperly balanced golf club or tennis racket feels awkward in the hand of an expert. One proper balance test which is commonly employed by a prospective purchaser of a conventional 16-ounce carpenter's claw hammer is to place the hammer head down on a flat level supporting surface, allowing the weight of the hammer to be borne on the curved surfaces of the claws near the base portions thereof so that the hammer assumes a rocking position with the handle extending upwardly at an angle with respect to the flat supporting surface. Then, if the hammer assumes a stable equilibrium, this is an indication of proper hammer balance. On the other hand, if the hammer assumes a degree of unstable equilibrium, this is an indication that the hammer is not properly balanced. A properly designed claw hammer having a solid hickory or other wooden handle is capable of passing such a test, but a claw hammer having either a solid or a completely tubular fiber glass handle is lacking in proper balance due to the greater density and weight of the impregnating material of the fiber glass and its lack of proper distribution throughout the handle.

The present fiber glass hammer handle overcomes these limitations in that it affords a better distribution of the plastic impregnating material throughout the body of the handle, the region in the vicinity of the hammer head being solid while the region remote from the hammer head being tubular or hollow. The solid region thus is conducive toward proper balance and also affords a solid reaction area for assimilating the impact of a misdirected hammer blow. Furthermore, fiber glass strand distribution throughout the handle is more satisfactory since there is a denser grouping of the fiber glass strands than is the case where wrapped fiber glass cloth having warp and woof threads is concerned. This grouping of fiber glass strands also lends a certain amount of resiliency to handle which is not possible where a great predominance of the solidified impregnating material exists and the relatively few glass fibers employed are widely spaced and not under longitudinal tension, or where they are overlapping and not continuous from one end of the handle to the other. Various other advantages of the present fiber glass hammer handle will become readily apparent as the nature of the invention is better understood from a consideration of the following detailed description.

The method by means of which the handle of the present invention is formed, and which has only briefly been described herein, constitutes the subject matter of my copending divisional Pat. application Ser. No. 74,377, filed on Sept. 22, 1970 and entitled "METHOD OF PRODUCING A HOLLOW HAMMER HANDLE WITH LONGITUDINALLY TENSIONED GLASS FIBERS." The handle-forming apparatus by means of which such method is carried out, and which likewise has only been briefly described herein, constitutes the subject matter of my copending divisional Pat. application Ser. No. 74,447, filed on Sept. 22, 1970 and entitled "APPARATUS FOR PRODUCING A HOLLOW HAMMER HANDLE WITH LONGITUDINALLY TENSIONED GLASS FIBERS."

The present invention consists in the several novel features which are hereinafter set forth and are more particularly defined by the claims at the conclusion hereof.

In the accompanying single sheet of drawings forming a part of this specification, one illustrative embodiment of the invention is shown. In these drawings:

FIG. 1 is a perspective view of a hammer handle embodying the present invention;

FIG. 2 is a longitudinal sectional view of the handle;

FIG. 3 is a fragmentary sectional view taken longitudinally through one end region of a closed handle-forming mold structure which is utilized in forming the present hammer handle; and FIG. 4 is a side elevational view of a completed hammer employing a glass fiber handle embodying the invention.

Referring now to the drawings in detail and in particular to FIGS. 1 and 4, a completed hammer handle assembly consists of two principal parts, namely, a handle proper or shank 10 adjacent to the forward or distal impact end thereof and a tubular handle grip 16 adjacent to the rear or proximate gripping end thereof. The present invention is concerned primarily with the construction of the handle proper or shank 10 and, therefore, throughout this specification and in the abstract preceding the same, as well as in the appended claims, the handle proper or shank is referred to simply as the "handle" in the interests of brevity.

The handle 10 is formed in its entirety of a polymerized high strength thermosetting epoxy resin or the like within which there are embedded a large number of closely grouped glass filaments or fibers 12, all of which extend in the general longitudinal direction of the handle and which exist in the hardened resin under tension. The contour of the handle 10 closely follows the contour of a conventional metal or wooden hammer handle, the proximate end region or section of the same being of a reduced character as shown at 14 in order for reception thereover of the grip 16 which preferably is formed of rubber or other elastomeric material. A generally rectilinear section 18 at the distal end of the handle is provided with the usual slot 20 therein for reception of a wedge 22 by means of which the handle section 18 may be expanded and thus tightened within the socket 24 of a conventional steel carpenter's claw hammer head 26 or other impact device. A relatively deep tapered socket 28 extends inwardly from the proximate end face of the handle to a point substantially midway between the opposite ends of the handle, the diameter of the open rim of the socket being slightly less than the transverse width of the handle in its shortest transverse direction. Thus, the wall of the socket decreases gradually in thickness progressively in a forward direction and the socket terminating substantially in the vicinity of the forward end of the tubular handle grip 16. The remaining portion of the handle is solid except for the provision of the wedge-receiving slot 20.

Although neither the apparatus nor the method by means of which the present hammer handle is produced constitutes a part of the present invention, a general understanding thereof will lead to a better understanding of the nature of the handle itself. Without giving consideration to any specific apparatus by means of which the handle 10 may be manufactured, and considering the handle forming method in its broadest aspect, a handle such as the handle 10 may be manufactured by submerging the glass filaments or fibers in a bath of the uncured liquid resin which functions as a binder and then arranging the fibers in substantial contiguity and parallelism to provide an elongated mold blank in which the fibers extend in a longitudinal direction, after which the blank is placed in a heated sectional mold by means of which liquid resin binder is polymerized, such a mold being fragmentarily illustrated in FIG. 3 and designated by the reference numeral 30. Prior to polymerization, a tapered mandrel such as is indicated at 32 is forcibly projected endwise into the filled mold in such manner as to spread the longitudinally extending glass fibers radially outwardly and thus establish the aforementioned tapered socket 28 in the handle undergoing molding. Prior to complete polymerization of the mold blank in the mold, the forcible projection of the mandrel 32 endwise into the mold causes a longitudinal flow of the displaced resinous material rearwardly and outwardly from the entrance orifice for the mandrel, this flow being enhanced by the thixotropic property of the binder-forming liquid resinous material which, upon initial absorption of heat, attains a greatly lowered coefficient of viscosity. The flow of the liquid resinous material is, therefore, relatively rapid yet the material retains sufficient tenacity with respect to the longitudinally extending fibers as literally to pull them rearwardly and tension them so that they become more truly linearly straight. As this thixotropic property of the resinous material diminishes and the material gradually sets or hardens, the fibers remain in tension until they are fixedly encased in the hardened and completely polymerized binder-forming material. This introduction of the mandrel also creates a greater fiber density in the wall of the socket 28 than in the solid distal section 18 of the handle undergoing molding but the escape of some of the resinous material as heretofore described renders the resinous material in the hollow proximate end section of the handle somewhat sparser than in the solid distal section 18, this feature contributing toward proper balance when the completed handle is applied to the hammer head 26. An insert at the far end of the mold remote from the mandrel establishes in the molded handle a conventional wedge slot by means of which the handle may be secured in the eye 24 of the hammer head 26.

The invention is not to be limited to the exact arrangement of parts shown in the accompanying drawings or described in this specification, since various changes in the details of construction be resorted to without departing from the spirit or scope of the invention.

Having thus described the invention what I claim as new and desire to secure by letters patent is:

1. A resilient molded integral handle adapted for use with a striking tool such as a hammer head and having forward and rear ends, said handle being formed of a polymerized thermosetting resinous binder which is reinforced by fiber glass filaments and having zones of varying cross-sectional area along its length, said handle having a forward solid section and a rearward tubular section established by walls which define a relatively deep socket which extends longitudinally inwardly from the rear end of the handle, the forward end of said solid section being adapted for reception thereover of said hammer head, and a plurality of closely grouped glass filaments entrained and embedded in said binder and extending generally longitudinally of the handle, substantially all of said filaments being continuous throughout the length of the handle, said closely grouped filaments, considered as a whole, merging in generally conical apronlike fashion in the vicinity of the bottom of the socket and passing longitudinally along said socket walls and existing in greater fiber density within said walls than within said solid section.

2. A resilient molded integral handle as set forth in claim 1 and wherein the portions of the glass filaments which extend longitudinally through said socket-defining walls are under longitudinal tension and are, therefore, in the main, linearly straight.

3. A resilient molded integral handle as set forth in claim 2 and wherein the socket defined by said walls extends inwardly from the rear end of the handle to a point adjacent the midpoint of the handle so that said solid and tubular sections are substantially equal in longitudinal extent.

4. A resilient molded integral handle as set forth in claim 3 and wherein said socket is forwardly tapered in the bottom regions thereof.

5. A resilient molded integral handle as set forth in claim 4 and wherein there is a greater proportion of the resinous material with respect to the binder in said solid section than there is in the walls of said socket of the tubular section.